(12) United States Patent
Watada et al.

(10) Patent No.: US 10,124,760 B2
(45) Date of Patent: Nov. 13, 2018

(54) BUCKLE DEVICE

(71) Applicant: KABUSHIKI KAISHA TOKAI-RIKA-DENKI-SEISAKUSHO, Aichi-ken (JP)

(72) Inventors: Yusuke Watada, Aichi-ken (JP); Takuhiro Saito, Aichi-ken (JP); Yasunori Hata, Aichi-ken (JP); Tatsuhiro Murasaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 45 days.

(21) Appl. No.: 15/410,102

(22) Filed: Jan. 19, 2017

(65) Prior Publication Data

US 2017/0210336 A1 Jul. 27, 2017

(30) Foreign Application Priority Data

Jan. 22, 2016 (JP) .................. 2016-010975

(51) Int. Cl.
*B60R 22/20* (2006.01)
*B60R 22/26* (2006.01)
(Continued)

(52) U.S. Cl.
CPC .......... *B60R 22/20* (2013.01); *A44B 11/2561* (2013.01); *B60R 22/03* (2013.01);
(Continued)

(58) Field of Classification Search
CPC ......... B60R 22/20; B60R 22/19; B60R 22/18; B60R 22/03; B60R 22/26; B60R 22/1806; A44B 11/2561; H02K 7/14
See application file for complete search history.

(56) References Cited

U.S. PATENT DOCUMENTS 5,725,249 A 3/1998 Nishide et al.
6,722,697 B2 * 4/2004 Krauss ................ B60R 22/1952
280/806

(Continued)

FOREIGN PATENT DOCUMENTS

JP H0924797 A 1/1997
JP 2015-044460 A 3/2015

OTHER PUBLICATIONS

Office Action issued in the corresponding Japanese Patent Application No. 2016-010975 dated Nov. 14, 2017.
(Continued)

*Primary Examiner* — Robert Sandy
*Assistant Examiner* — Rowland Do
(74) *Attorney, Agent, or Firm* — Roberts Mlotkowski Safran Cole & Calderon, P.C.

(57) ABSTRACT

Load input to an occupant from a buckle is reduced. A lift-up buckle device includes a buckle that engages with a tongue inserted through webbing worn by an occupant. The lift-up buckle device also includes wires that each include a portion configuring a first fixed portion fixed to the buckle side and another portion configuring a supported portion supported by a wire guide, and that move the buckle due to a distance between the fixed portions and the supported portions being changed. Respective locations between the fixed portions and the supported portions of the wires are displaced in a direction intersecting an engaged direction of the tongue when an external force in a direction of the engaged direction of the tongue has been input to the buckle.

4 Claims, 5 Drawing Sheets

(51) Int. Cl.
  *A44B 11/25* (2006.01)
  *H02K 7/14* (2006.01)
  *B60R 22/03* (2006.01)
  *B60R 22/18* (2006.01)
  *B60R 22/19* (2006.01)

(52) U.S. Cl.
  CPC .............. *B60R 22/18* (2013.01); *B60R 22/19* (2013.01); *B60R 22/26* (2013.01); *H02K 7/14* (2013.01); *B60R 2022/1806* (2013.01)

(56) References Cited

U.S. PATENT DOCUMENTS

| | | | | |
|---|---|---|---|---|
| 6,808,207 B2* | 10/2004 | Nakano | ............... | B60R 22/1952 277/634 |
| 6,902,195 B2* | 6/2005 | Ball | ................... | B60R 22/1955 280/806 |
| 6,932,324 B2* | 8/2005 | Biller | ................. | B60R 22/1952 254/230 |
| 7,188,868 B2* | 3/2007 | Yamaguchi | ........... | B60R 22/195 280/806 |
| 8,196,961 B2* | 6/2012 | Lane, Jr. | ............. | B60R 22/1952 280/806 |
| 8,317,228 B2* | 11/2012 | Mages | ................ | B60R 22/1951 280/806 |
| 9,527,472 B2* | 12/2016 | Shimazu | ................. | B60R 22/20 |
| 2004/0217583 A1* | 11/2004 | Wang | ...................... | B60R 22/03 280/805 |
| 2005/0224270 A1* | 10/2005 | Holbein | .................. | B60R 22/03 180/268 |
| 2006/0231317 A1* | 10/2006 | Yamaguchi | ............. | B60R 22/03 180/268 |
| 2006/0279077 A1* | 12/2006 | Nakano | ............... | B60R 22/1952 280/806 |
| 2013/0032653 A1 | 2/2013 | Holbein et al. | | |
| 2014/0132056 A1* | 5/2014 | Yilma | .................... | B60R 22/20 297/481 |

OTHER PUBLICATIONS

Japanese Office Action dated May 22, 2018 in Application No. 2016-010975; 6 pages.

* cited by examiner

BUCKLE DEVICE

CROSS-REFERENCE TO RELATED APPLICATION

This application claims priority under 35 U.S.C. 119 from Japanese Patent Application No. 2016-010975 filed Jan. 22, 2016, the disclosure of which is incorporated by reference herein.

BACKGROUND

Field of the Invention

The present invention relates to a buckle device.

Related Art

The specification of U.S. Patent Application Publication No. 2013/0032653 describes a buckle device including a buckle that engages with a tongue through which webbing worn by an occupant is inserted. The buckle device includes a motor, a spindle nut that is moved due to the motor being driven, and a cable that connects the spindle nut and the buckle together. The motor is driven and the spindle nut is moved to pull the cable and move the buckle.

It is conceivable that the occupant might contact the buckle when the occupant is boarding the vehicle, or when getting off the vehicle. It is desirable to be able to reduce the load input from the buckle to the occupant in such cases.

SUMMARY

In consideration of the above circumstances, a buckle device capable of reducing a load input to an occupant from a buckle is obtained.

A buckle device of a first aspect of the present invention includes: a buckle that engages with a tongue through which webbing worn by an occupant is inserted; and a coupling member, a portion of the coupling member being a fixed portion that is fixed to a buckle side and another portion of the coupling member being a supported portion that is supported by a supporting member, the buckle being moved due to a distance between the fixed portion and the supporting member being changed, wherein a location of the coupling member, which is between the fixed portion and the supported portion, is displaced in a direction intersecting an engaged direction of the tongue when an external force in a direction of the engaged direction of the tongue has been input to the buckle.

A buckle device of a second aspect of the present invention is the buckle device of the first aspect of the present invention, wherein the coupling member is configured by a pair of wires that are disposed next to each other; and one location of one of the wires, which location is between the fixed portion and the supported portion of the one of the wires, and another location of another of wires, which location is between the fixed portion and the supported portion of the another of wires, are displaced in different directions to each other when the external force in the engaged direction of the tongue has been input to the buckle.

In the buckle device of the first aspect, the buckle is moved when the distance between the fixed portion of the coupling member that is fixed to the buckle and the supporting member is changed. Note that when external force in the direction of the engaged direction of the tongue is input to the buckle due to the occupant contacting the buckle, the location of the coupling member that is between the fixed portion fixed to the buckle and the supported portion supported by the supporting member is displaced in the direction intersecting the engaged direction of the tongue. This enables load input to the occupant from the buckle (load due to a reaction to load input from the occupant to the buckle) to be reduced.

In the first aspect, it is possible that an end portion at the buckle side of the coupling member, which extends out from the buckle side, is sloped with respect to the engaged direction.

In the buckle device of the second aspect, the buckle is moved when the distance between the fixed portions of the pair of wires that are fixed to the buckle and the supporting member is changed. Note that when external force in the engaged direction of the tongue is input to the buckle due to the occupant contacting the buckle, the respective one location and another location of the pair of wires between the fixed portions that are fixed to the buckle and the supported portions that are supported by the supporting member are displaced in directions intersecting the engaged direction of the tongue and in different directions to each other. This enables load input to the occupant from the buckle (load due to a reaction to load input from the occupant to the buckle) to be reduced.

In the second aspect, it is possible that an end portion at the buckle side of the one of the wire, which extends out from the buckle side, and an end portion at the buckle side of the another of the wires, which extends out from the buckle side, are sloped in opposite directions with respect to the engaged direction.

BRIEF DESCRIPTION OF THE DRAWINGS

Exemplary embodiments of the present invention will be described in detail based on the following figures, wherein.

DETAILED DESCRIPTION

Explanation follows regarding a buckle device according to an exemplary embodiment, with reference to FIG. 1 to FIG. 4. Note that in the below explanation, reference to the front, rear, left, right, up, and down directions refers to the front, rear, left, right, up, and down directions as viewed by an occupant seated in a vehicle seat, and the arrow FR indicates the forward direction and arrow UP indicates the upward direction in each of the drawings as appropriate.

Figure 1:
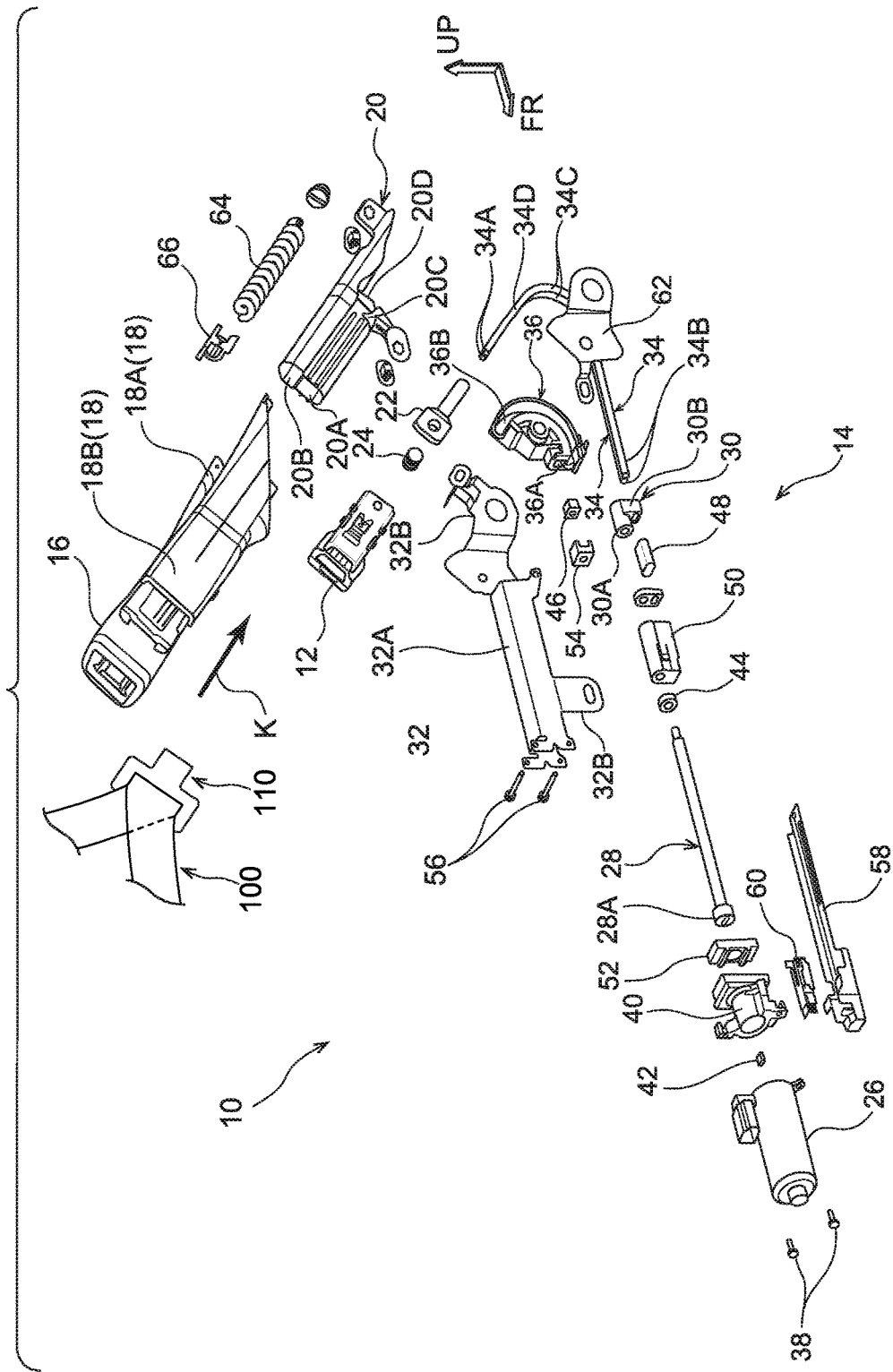
FIG. 1 is an exploded perspective view illustrating a lift-up buckle device.

As illustrated in FIG. 1, a lift-up buckle device 10 serving as a buckle device of the present exemplary embodiment includes a buckle 12 that engages with a tongue 110 through which webbing 100 worn by an occupant is inserted, and a lift-up device 14 that moves the buckle 12 from a housed position to a raised position. The lift-up buckle device 10 also includes a buckle lower cover 18 serving as a second cover and a buckle upper cover 16 attached to the buckle 12, and a lower cover 20 serving as a first cover that supports the buckle lower cover 18 so as to allow sliding.

Buckle 12

The buckle 12 includes a non-illustrated engagement portion that engages with the tongue 110 and a release operation portion that releases this engagement. End portions on one side of a pair of wires 34, described later, are fixed to the buckle 12 through a joint anchor 22 and a rivet 24. Note that a direction in which the tongue 110 is engaged in the buckle 12 is indicated as an arrow K. In the below explanation, this direction is mentioned as "an engaged direction K".

Lift-Up Device 14

Figure 2:
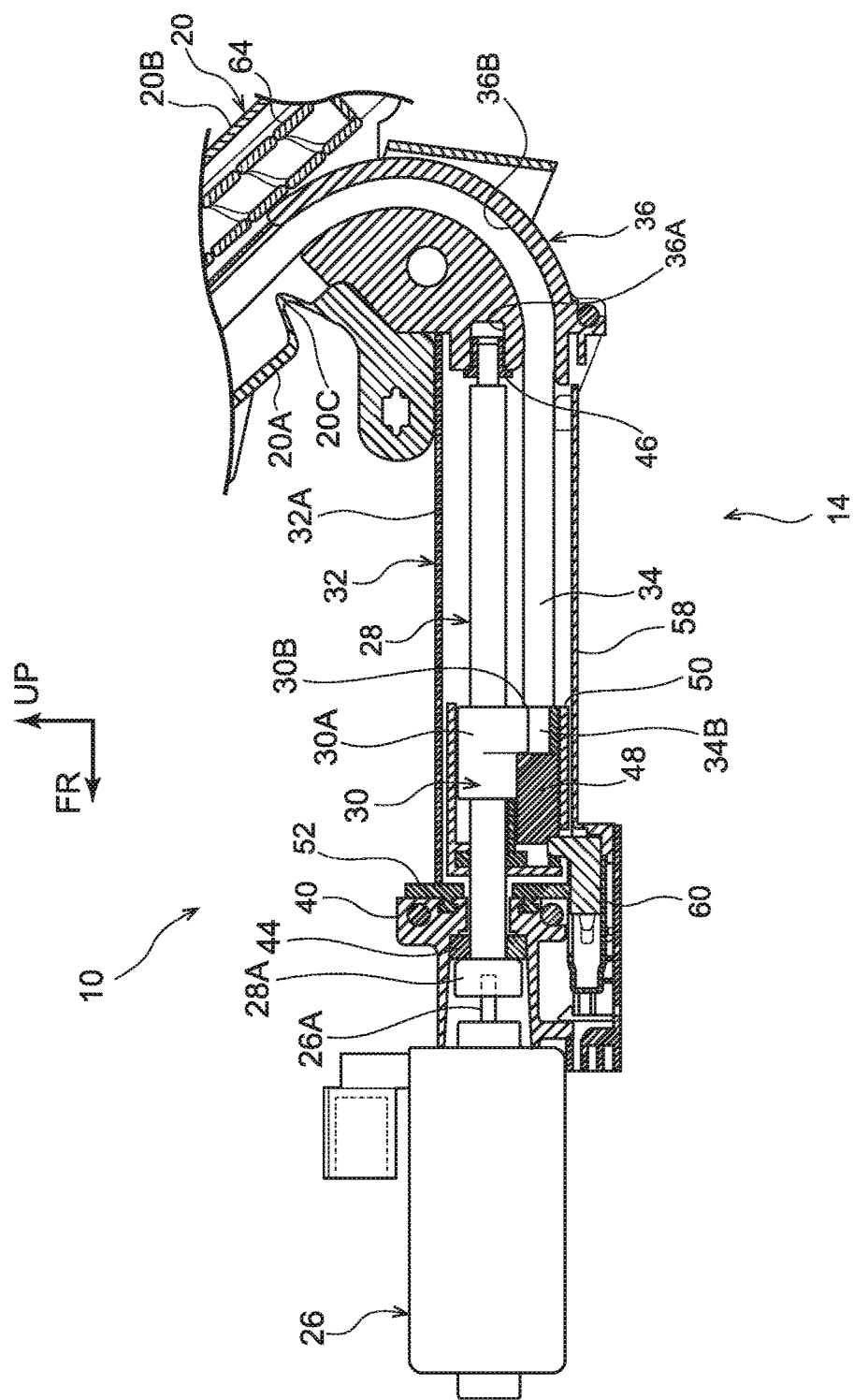
FIG. 2 is a cross-section illustrating a cross-section of a lift-up buckle device.

As illustrated in FIG. 1 and FIG. 2, the lift-up device 14 includes a motor 26 with an output shaft 26A (see FIG. 2) that is capable of rotating toward one side and another side about its axial line direction, a drive screw 28 that engages with the output shaft 26A of the motor 26 so as to be capable of rotating integrally with the output shaft 26A, and a slider 30 that is moved along the axial direction of the drive screw 28 accompanying rotation of the drive screw 28. The lift-up device 14 also includes a rail 32 that guides the slider 30, the pair of wires 34 serve as coupling members, whose end portions on another side are anchored to the slider 30 and which are disposed with an interval therebetween in the seat width direction, and a wire guide 36 serving as a guide member and a support member that guides the pair of wires 34.

The motor 26 is a DC motor, and the motor 26 is fixed to a housing 40 through screws 38 and the like.

The drive screw 28 is formed in a rod shape using a steel material or the like. A male thread is formed running along the length direction at an outer peripheral portion of the drive screw 28. One end portion of the drive screw 28 configures an engagement portion 28A that engages with the output shaft 26A of the motor 26. Note that a screw damper 42 formed using an elastic member is interposed between the engagement portion 28A and the output shaft 26A of the motor 26. A portion on the engagement portion 28A side of the drive screw 28 is supported so as to be capable of rotating by the housing 40 through a bearing 44. Another end portion of the drive screw 28 is supported so as to be capable of rotating by a shaft support hole 36A formed in the wire guide 36, described later, through a bushing 46 formed using a resin material or the like.

The slider 30 is formed using a metal material. The slider 30 is configured including a drive screw engagement portion 30A including a female thread portion that screws together with the male thread portion formed to the drive screw 28, and a wire fixing portion 30B through which the wires 34 are inserted. Caulking, crimping or the like is performed in a state in which the another side end portions of the pair of wires 34 have been inserted through the wire fixing portion 30B, such that the another side end portions of the wires 34 do not come out from the wire fixing portion 30B (such that a state in which the another side end portions of the wires 34 are anchored to the wire fixing portion 30B is secured). Note that a piece 48 is fixed to the another side end portions of the wires 34. A shoe 50, which is formed using a resin material or the like and has an outer profile formed in a shape corresponding to the shape of the inside of the rail 32, described later, is attached to the slider 30. The slider 30 moves together with the shoe 50 inside the rail 32. Note that a position of the buckle 12 in a state in which the slider 30 and the shoe 50 are positioned on the housing 40 side (the state illustrated in FIG. 2) is referred to as the "housed position", whereas a position of the buckle 12 in a state in which the slider 30 and the shoe 50 are positioned on the wire guide 36 side is referred to as the "raised position".

Dampers 52 and 54 (see FIG. 1) are respectively attached to the housing 40 and the wire guide 36. Thus avoids the shoe 50 moving together with the slider 30 directly abutting the housing 40 and the wire guide 36.

The rail 32 is formed by for example performing pressing process to a steel sheet member. The rail 32 is formed with a substantially U-shaped cross-section open at the lower side, and includes a slider guide portion 32A inside which the drive screw 28, the slider 30, and so on are disposed. The housing 40 is fixed to one length direction side of the slider guide portion 32A of the rail 32 through screws 56 and the like. The wire guide 36, described later, is fixed to another length direction side of the slider guide portion 32A of the rail 32. Note that the rail 32 includes a fixing portion 32B with an insertion hole through which a non-illustrated bolt is inserted. The non-illustrated bolt inserted through the insertion hole of the fixing portion 32B is screwed into a screw hole formed in a seat cushion frame or the like, thereby fixing the lift-up buckle device 10 to the seat cushion frame or the like. A rail cover 58 is attached to the frame 32. An open portion end of the slider guide portion 32A is thereby covered by the rail cover 58. A housed-position detection switch 60 is attached to the rail cover 58. The shoe 50 that moves together with the slider 30 engages with the housed-position detection switch 60, such that detection is made when the buckle 12 is positioned in the "housed position".

The wire guide 36 is formed in a block shape with a substantially fan shape in a side-on view. The previously-described shaft support hole 36A and a guide groove 36B, serving as a guide section that guides the pair of wires 34, are formed in the wire guide 36. The guide groove 36B is open on one seat width direction side and is formed in a substantially U shape in a side-on view (as viewed from the seat width direction). The depth of the guide groove 36B (a dimension in the seat width direction from an open end to a closed end thereof) is set with a dimension that is slightly larger than a dimension of double the diameter of the wire 34. The pair of wires 34 are disposed inside the guide groove 36B in a state arrayed (side by side) in the depth direction of the guide groove 36B, such that the portions of the pair of wires 34 disposed inside the guide groove 36B are curved in a substantially U shape. Note that in the present exemplary embodiment, the open end side of the guide groove 36B formed in the wire guide 36 is closed off by a cover plate 62, such that the pair of wires 34 do not come out of the guide groove 36B.

Lower Cover 20

The lower cover 20 is formed in a tube shape using an elastic material such as rubber as an example, and one side end portion of the lower cover 20 engages with the wire guide 36. The lower cover 20 includes a wire insertion portion 20A through which the pair of wires 34 are inserted, and a curled cord insertion portion 20B inserted through a curled cord 64 connected to a buckle switch for detecting whether or not the tongue has engaged with the buckle 12. A narrow (neck) portion 20C is formed in a location on the wire guide 36 side of the wire insertion portion 20A. The lower cover 20 can be tilted in the seat front-rear direction by bending the lower cover 20 with the narrow portion 20C as a deformation origin.

Buckle Lower Cover 18

The buckle lower cover 18 is formed using a resin material or the like that is harder than the lower cover 20 as an example. Together with the buckle cover 16, the buckle lower cover 18 covers the buckle 12. The buckle lower cover 18 is formed in a tube shape by joining together an outer cover 18A disposed on one seat width direction side and an inner cover 18B disposed on another seat width direction side. The lower cover 20 is inserted into the buckle lower cover 18, such that the buckle lower cover 18 is capable of sliding along the lower cover 20. Ends on the wire guide 36 side of both seat width direction side portions of the buckle lower cover 18 are sloped with respect to the slide direction of the buckle lower cover 18 relative to the lower cover 20 in a seat side-on view. Note that a curled-cord bracket 66 attached to the curled cord 64 is anchored to the buckle lower cover 18. Thus, the curled cord 64 wound in a spiral shape is stretched-pulled when the buckle lower cover 18 slides away from the wire guide 36 with respect to the lower cover 20.

Explanation follows regarding a configuration of the pair of wires 34, these being a relevant portion of the present exemplary embodiment.

Figure 5:
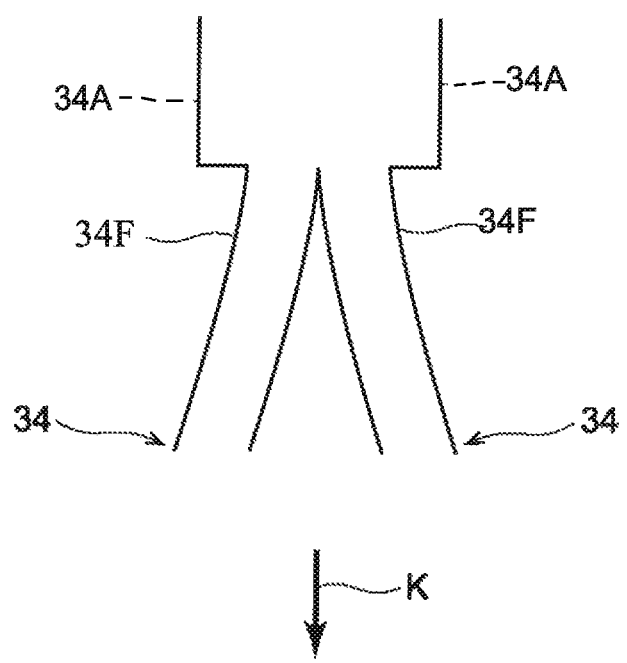
FIG. 5 is a cross-sectional view illustrating a pair of wires at the buckle side in a state prior to external force being input to a buckle.

The wire 34 is formed by netting plural raw material wires formed with a specific diameter using stainless steel or the like. In the present exemplary embodiment, the pair of wires 34 are set with the same length and disposed side by side (adjacent to each other) in the seat width direction. The one side end portions of the pair of wires 34 are first fixed portions 34A serving as fixed portion that are fixed by caulking to the joint anchor 22. Due to the first fixed portions 34A of the pair of wires 34 being caulked to the joint anchor 22, joint anchor 22 side end portions 34F of portions of the pair of wires 34, that extend out from the joint anchor 22, slope in different directions (opposite directions) to each other with respect to the engaged direction K. Note that the slope angles are small angles of several degrees. In FIG. 5, in order to make explanation plain, the slope angles are shown larger than "several degrees". The centroid of portion where the first fixed portions 34A of the pair of wires 34 are caulked at the joint anchor 22 as viewed from the engaged direction K is positioned in a different position to the centroid of the first fixed portion 34A of each wire 34 as viewed from the engaged direction K.

The another side end portions of the pair of wires 34 are caulked in a state inserted through the wire fixed portion 30B of the slider 30, and configure second fixed portions 34B to which the piece 48 is fixed.

Respective portions of the pair of wires 34 disposed inside the guide groove 36B of the wire guide 36 configure supported portions 34C that are supported by the guide groove 36B. The depth of the guide groove 36B is set with a slightly larger dimension than a dimension of double the diameter of each wire 34 (a seat width direction dimension of the pair of wires 34), such that the supported portions 34C of the pair of wires 34 are capable of moving in the seat width direction. Note that this movement amount is a small distance of several millimeters.

Operation and Advantageous Effects of Present Exemplary Embodiment

Explanation follows regarding operation and advantageous effects of the present exemplary embodiment.

When detection is made that an occupant has sat in the vehicle seat including the lift-up buckle device 10 illustrated in FIG. 1 and FIG. 2, the motor 26 of the lift-up device 14 rotates the drive screw 28 toward the one side. When the slider 30 is accordingly moved along the drive screw 28 due to the drive screw 28 rotating, the distance between the first fixed portions 34A of the pair of wires 34 and the supported portions 34C supported by the wire guide 36 changes (becomes longer). The buckle 12 (the joint anchor 22) fixed to the one side end portions of the pair of wires 34 is thereby moved toward the seat upper side. Namely, the buckle 12 is thereby moved from the "raised position" to the "housed position". As the result, this enables the occupant to easily engage the tongue 110 with the buckle 12. Namely, this enables the occupant to easily put on the webbing 100. When the buckle switch has detected that the tongue 110 has engaged with the buckle 12, the motor 26 of the lift-up device 14 rotates the drive screw 28 toward the another side. The buckle 12 is thereby moved from the "raised position" to the "housed position".

Note that in the present exemplary embodiment, when the lift-up device 14 is actuated, the buckle lower cover 18 inserted with the lower cover 20 moves together with the buckle 12. In the state in which the buckle 12 is positioned in the "raised position", a seat lower side end of the buckle lower cover 18 is positioned further toward the seat lower side than a seat upper side end of the lower cover 20. This suppresses the wires 34 and the curled cord 64 from being seen between the lower cover 20 and the buckle lower cover 18.

Figure 3:
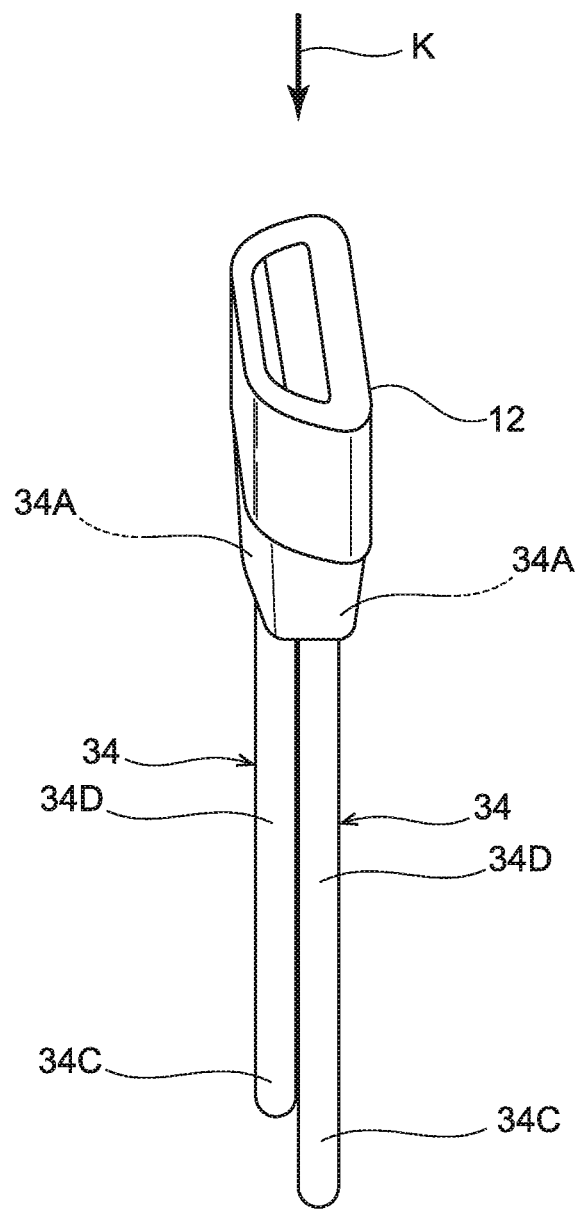
FIG. 3 is a schematic view illustrating a pair of wires in a state prior to external force being input to a buckle.
Figure 4:
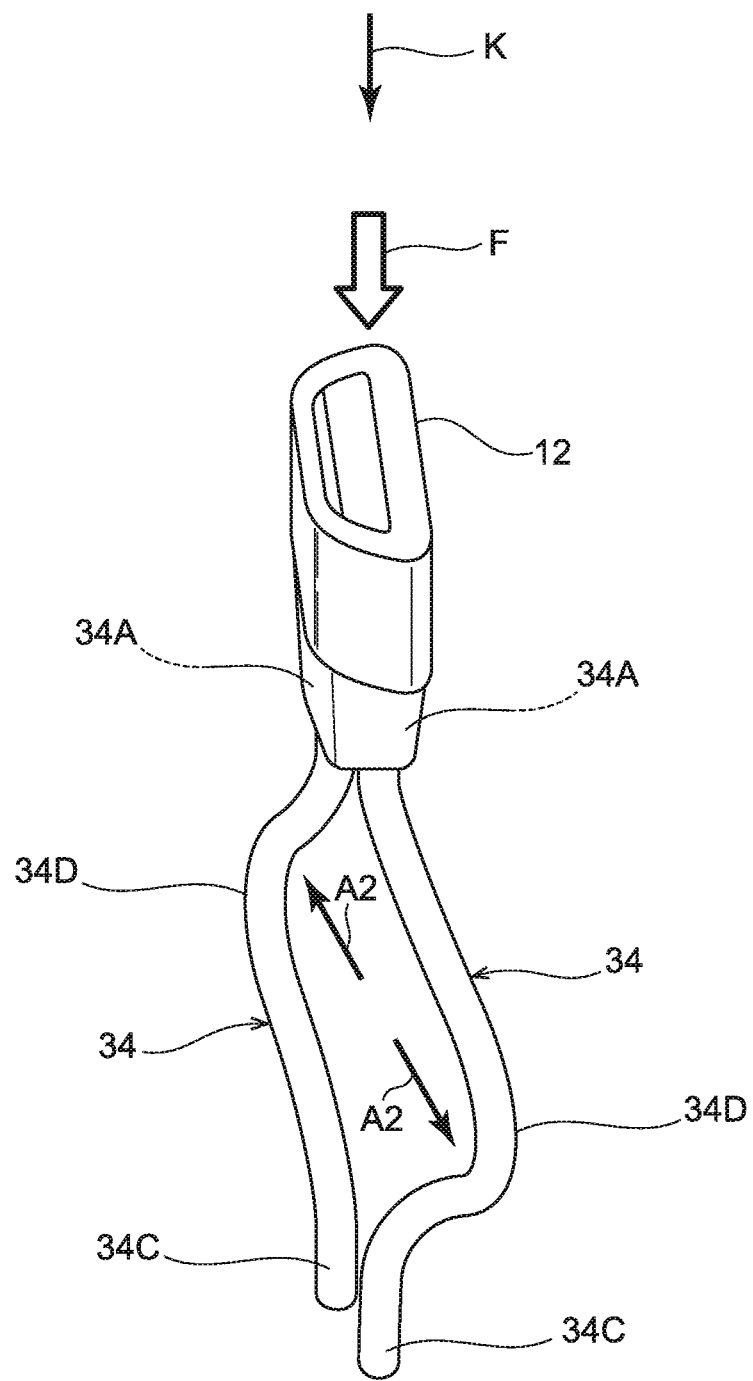
FIG. 4 is a schematic view illustrating a pair of wires in a state in which external force has been input to a buckle.

In the present exemplary embodiment, when an external force F in the engaged direction K is input to the buckle 12 due to the buttocks of the occupant pressing the buckle 12, for example, as illustrated in FIG. 3 and FIG. 4, respective locations 34D of the pair of wires 34 between the first fixed portions 34A fixed to the buckle 12 and the supported portions 34C supported by the wire guide 36 are displaced in directions A1 and A2, these being directions that intersect the engaged direction K and are different from each other (opposite directions). Thus, the buckle 12 is capable of moving in a direction of the engaged direction K by a distance corresponding to the displacement amounts of the locations 34D of the pair of wires 34. This accordingly enables load input to the occupant from the buckle 12 (load due to a reaction to load input to the buckle 12 from the occupant) to be reduced.

Such a configuration, in which the pair of wires 34 are both deformed, enables load input from the buckle 12 to the pair of wires 34 to be distributed to the pair of wires 34. This enables the durability of each wire 34 to be improved.

Note that in the present exemplary embodiment, an example has been given in which the buckle 12 is configured so as to be displaced between the "housed position" and the "raised position" due to the pair of wires 34 being displaced; however, the present disclosure is not limited thereto. For example, a configuration may be applied in which the buckle 12 is displaced between the "housed position" and the "raised position" due to a single wire 34 being displaced. In such a case, due to the joint anchor 22 side end portion 34F (FIG. 5) of the portion of the single wire 34, that extends out from the joint anchor 22, being made sloped with respect to the engaged direction K, and so on, the location 34D of the single wire 34 between the first fixed portion 34A fixed to the buckle 12 and the supported portion 34C supported by the wire guide 36 is configured so as to be displaced in a direction intersecting the engaged direction K when external force in a direction of the engaged direction K is input to the buckle 12, thereby enabling load input from the buckle 12 to the occupant to be reduced.

An exemplary embodiment has been explained above; however, the present disclosure is not limited to the above explanation, and obviously various other modifications may be implemented within a range not departing from the spirit of the present disclosure.

What is claimed is:

1. A buckle device comprising:
   a buckle that engages with a tongue through which webbing worn by an occupant is inserted; and a coupling member, a portion of the coupling member being a fixed portion that is fixed to a buckle side and another portion of the coupling member being a supported portion that is supported by a supporting member, the buckle being moved due to a distance between the fixed portion and the supporting member being changed, wherein a location of the coupling member, which is between the fixed portion and the supported portion, is displaced in a direction intersecting a direction from the buckle to the supporting member when an external force in the direction from the buckle to the supporting member is input to the buckle, and the coupling member is configured by one wire and another wire that are disposed next to each other; and one location of the one wire, which location is between the one fixed portion and one supported portion of the one wire, and another location of the another of wire, which location is between the another fixed portion and another supported portion of the another wire, are displaced in different directions to each other and in separating directions separated to each other when the external force is input to the buckle, and an end portion at the buckle side, which extends out from the buckle toward the supporting member side, of the one wire, and an end portion at the buckle side, which extends out from the buckle toward the supporting member side, of the another wire, are sloped away from each other in separating directions with respect to the direction from the buckle to the supporting member.

2. The buckle device of claim 1, wherein an end portion at the buckle side of the coupling member, which extends out from the buckle side, is sloped with respect to the engaged direction.

3. The buckle device of claim 1, wherein, in a side-on view of the buckle device, the supported portion is supported by the supporting member so as to be curved at the supporting member.

4. The buckle device of claim 1, wherein the supported portion is supported by the supporting member such that the one wire and the another wire are disposed next to each other at the supporting member in a side-on view direction.

* * * * *